US007493771B2

(12) United States Patent
Lohmueller et al.

(10) Patent No.: US 7,493,771 B2
(45) Date of Patent: Feb. 24, 2009

(54) METHODS AND APPARATUSES FOR ASSEMBLING A GAS TURBINE ENGINE

(75) Inventors: Steven Joseph Lohmueller, Reading, OH (US); Robert P. Czachor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 11/289,965

(22) Filed: Nov. 30, 2005

(65) Prior Publication Data

US 2007/0119181 A1 May 31, 2007

(51) Int. Cl.
*F02C 7/20* (2006.01)

(52) U.S. Cl. ............................ 60/796; 60/799; 415/136

(58) Field of Classification Search ................... 60/796, 60/798, 800, 797, 799; 415/136, 138, 139, 415/209.2, 209.4, 189, 190
See application file for complete search history.

(56) References Cited

U.S. PATENT DOCUMENTS

| | | | | |
|---|---|---|---|---|
| 4,078,812 | A * | 3/1978 | Beckershoff | 277/543 |
| 5,180,281 | A * | 1/1993 | Burge et al. | 415/209.2 |
| 5,224,825 | A * | 7/1993 | Strang et al. | 415/209.3 |
| 6,324,830 | B1 | 12/2001 | Spooner et al. | |
| 6,382,905 | B1 * | 5/2002 | Czachor et al. | 415/9 |
| 6,397,603 | B1 * | 6/2002 | Edmondson et al. | 60/753 |
| 6,401,447 | B1 * | 6/2002 | Rice et al. | 60/796 |
| 6,449,952 | B1 * | 9/2002 | Emilianowicz et al. | 60/772 |
| 6,895,757 | B2 * | 5/2005 | Mitchell et al. | 60/772 |
| 6,904,757 | B2 * | 6/2005 | Mitchell et al. | 60/800 |
| 6,935,836 | B2 * | 8/2005 | Ress et al. | 415/173.2 |
| 6,988,369 | B2 * | 1/2006 | Conete et al. | 60/796 |
| 7,290,982 | B2 * | 11/2007 | Girard et al. | 415/173.4 |
| 2002/0184890 | A1 * | 12/2002 | Camy et al. | 60/796 |
| 2004/0118127 | A1 * | 6/2004 | Mitchell et al. | 60/796 |
| 2004/0250548 | A1 * | 12/2004 | Howell et al. | 60/796 |

FOREIGN PATENT DOCUMENTS

| | | | |
|---|---|---|---|
| EP | 1054137 | A2 | 11/2000 |
| EP | 1564382 | A2 | 3/2007 |
| FR | 2465080 | | 3/1981 |
| GB | 2355302 | A | 4/2001 |

OTHER PUBLICATIONS

EPO Search Report; Reference 135491/11771; Application No./Patent No. 06255019.90-2315; Dated Mar. 19, 2007; 5 pgs.

* cited by examiner

*Primary Examiner*—William H Rodriguez
(74) *Attorney, Agent, or Firm*—William Scott Andes, Esq.; Armstrong Teasdale LLP

(57) ABSTRACT

A method for assembling a gas turbine engine includes coupling an axisymmetric structure within the gas turbine engine, wherein the axisymmetric structure includes at least one mounting bushing extending from a radially outer surface of the axisymmetric structure, and inserting a pin having a crowned surface at least partially into the mounting bushing such that the pin provides both axial and tangential support to the axisymmetric structure, and securing the pin to the gas turbine engine utilizing a retaining assembly.

20 Claims, 10 Drawing Sheets

METHODS AND APPARATUSES FOR ASSEMBLING A GAS TURBINE ENGINE

STATEMENT REGARDING FEDERALLY SPONSORED RESEARCH & DEVELOPMENT

The U.S. Government has certain rights in this invention as provided for by the terms of Contract No. N00421-02-C-3202.

BACKGROUND OF THE INVENTION

This invention relates generally to gas turbine engines, and more particularly to methods and apparatus for assembling gas turbine engines.

At least some known gas turbine engines include axisymmetric structures, such as combustors for example. During operation, thermal differentials between the concentric axisymmetric flowpath components may result in thermal stresses being induced. Although providing for relative radial movement between the concentric axisymmetric structures may facilitate reducing such thermal stresses, such arrangements make it more difficult to maintain at least some of the axisymmetric hardware substantially concentric to the engine centerline axis to facilitate proper operation of the gas turbine engine. Moreover, thermal differentials between the axisymmetric structures may result in excessive loads resulting in relatively high cyclic stress and/or fatigue cracks in the axisymmetric structures.

One known method of resolving the thermal differential problem is illustrated in FIG. 1. As shown in FIG. 1, at least one known gas turbine engine includes a combustor casing that includes a plurality of radially oriented pins 2 that engage female bushings 3 that are coupled to the combustor 4. The pins are threaded into the combustor outer casing 5, which surrounds the combustor. In operation, the combustor, which is considerably hotter than the casing, is free to expand in a radial direction.

However, as shown in FIG. 1, to assemble the combustor within the gas turbine engine, the dimensional tolerances of the components require a radial clearance in the fit of the male pin to the female bushing to permit assembly. As a result, during operation, only a portion of the radial pins support the axial load and react to tangential forces. As such, these radial pins may experience increased wear compared to other radial pins utilized to support the combustor. In addition, slight dimensional misalignment of either the pins, the bushing bores, or both, may cause the load to be concentrated on either the edge of the bushing and/or the end of the pin. This concentrated load on what is initially a point contact on the pin and/or bushing again may result in increased wear of the bushing and/or the pin.

BRIEF DESCRIPTION OF THE INVENTION

In one aspect, a method for assembling a gas turbine engine is provided. The method includes coupling an axisymmetric structure within the gas turbine engine, wherein the axisymmetric structure includes at least one mounting bushing extending from a radially outer surface of the axisymmetric structure, and inserting a pin having a crowned surface at least partially into the mounting bushing such that the pin provides both axial and tangential support to the axisymmetric structure, and securing the pin to the gas turbine engine utilizing a retaining assembly.

In another aspect, an assembly for coupling an axisymmetric structure within the gas turbine engine is provided. The axisymmetric structure includes at least one mounting bushing extending from a radially outer surface of the axisymmetric structure. The assembly includes a pin having a crowned surface inserted at least partially into the mounting bushing such that the pin provides both axial and tangential support to the axisymmetric structure, and a retaining assembly to secure the pin to a portion of the gas turbine engine, the retaining assembly comprising at least one of a substantially triangular shaped retaining device and a substantially oval shaped retaining device.

In a further aspect, a gas turbine engine is provided. The gas turbine engine includes an axisymmetric structure within the gas turbine engine, wherein the axisymmetric structure includes at least one mounting bushing extending from a radially outer surface of the axisymmetric structure, and an assembly for coupling the axisymmetric structure within the gas turbine engine. The assembly includes a pin having a crowned surface inserted at least partially into the mounting bushing such that the pin provides both axial and tangential support to the axisymmetric structure, and a retaining assembly to secure the pin to a portion of the gas turbine engine, the retaining assembly comprising at least one of a substantially triangular shaped retaining device and a substantially oval shaped retaining device.

DETAILED DESCRIPTION OF THE INVENTION

Figure 2:
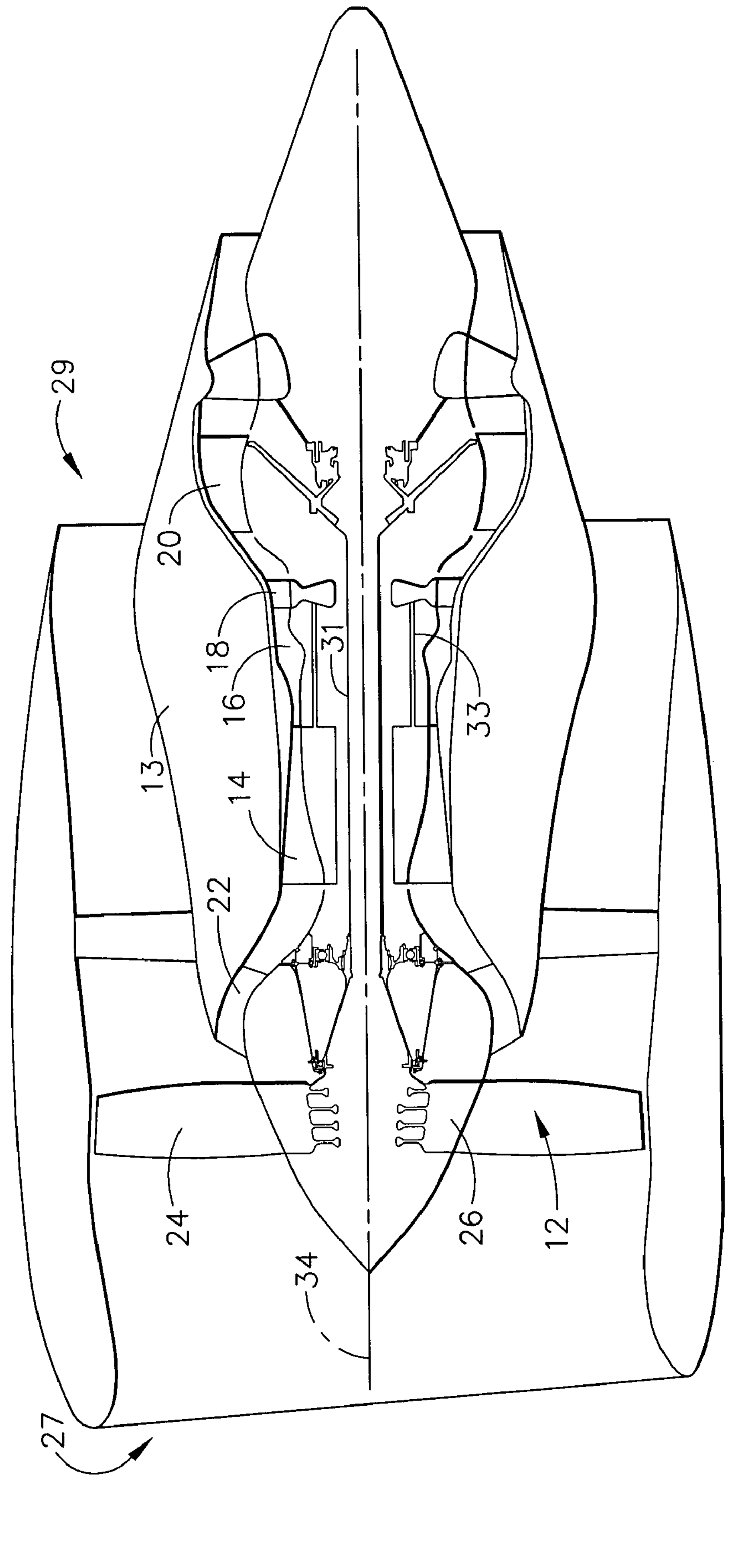
FIG. 2 is a schematic view of an exemplary gas turbine engine.

FIG. 2 is a schematic illustration of a gas turbine engine assembly 10 including a fan assembly 12 and a core engine 13 including a high pressure compressor 14, a combustor 16, and a high pressure turbine 18. In the exemplary embodiment, gas turbine engine assembly 10 also includes a low pressure turbine 20 and a booster 22. Fan assembly 12 includes an array of fan blades 24 extending radially outward from a rotor disc 26. Gas turbine engine assembly 10 has an intake side 27 and an exhaust side 29. In one embodiment, the gas turbine engine is a CF6-50 available from General Electric Company, Cincinnati, Ohio. Fan assembly 12, turbine 20, and booster 22 are coupled together by a first rotor shaft 31, and compressor 14 and turbine 18 are coupled together by a second rotor shaft 33.

Figure 1:
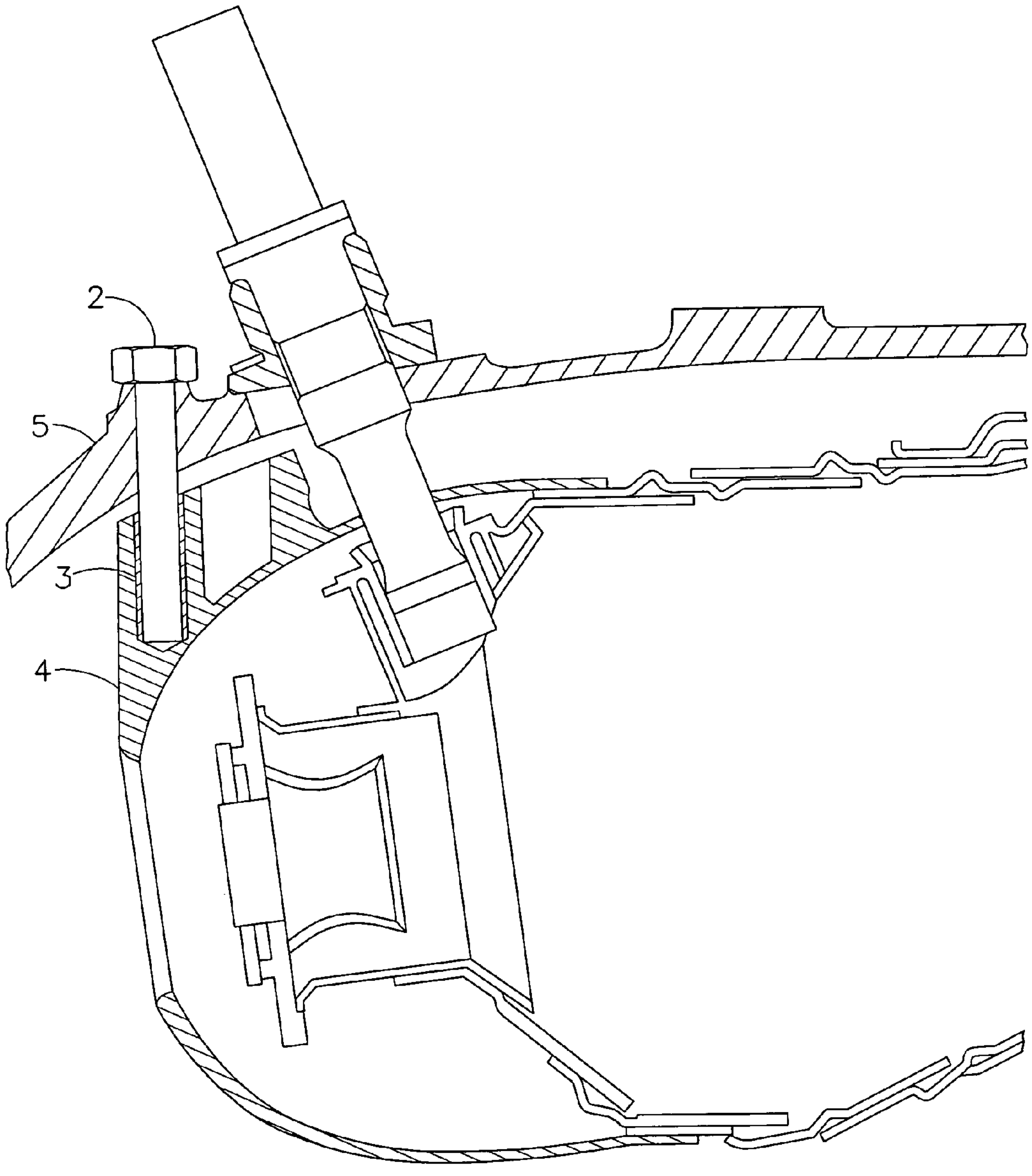
FIG. 1 (PRIOR ART)
FIG. 1 is a cross-sectional view of a prior art radial pin.

During operation, air flows axially through fan assembly 12, in a direction that is substantially parallel to a central axis 34 extending through engine 10, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 3:
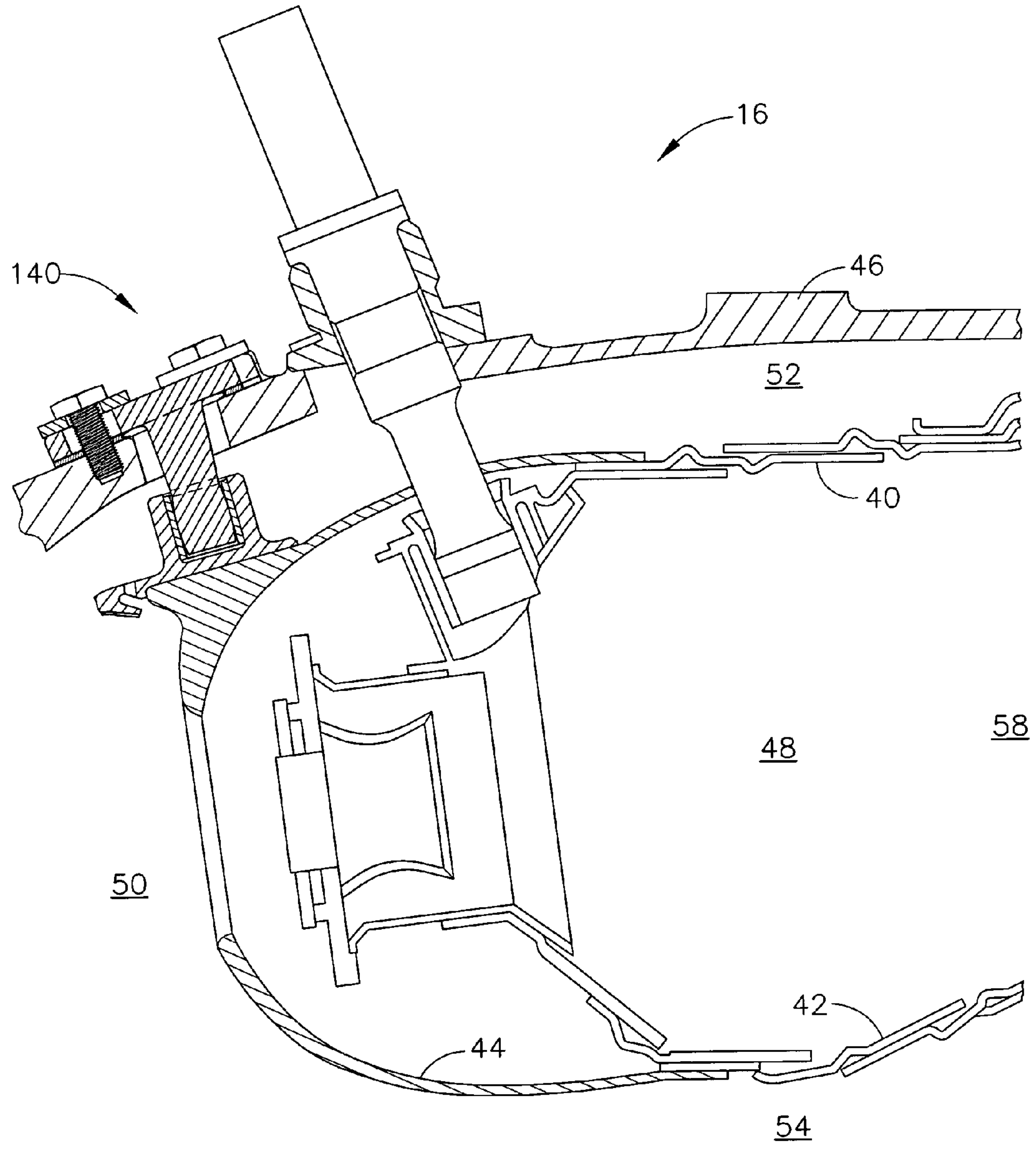
FIG. 3 is a cross-sectional view of a portion of the gas turbine engine shown in FIG. 2.

FIG. 3 is a cross-sectional view of combustor 16 shown in FIG. 2. In the exemplary embodiment, combustor 16 includes an annular outer liner 40, an annular inner liner 42, and a combustor dome assembly 44 extending between outer and inner liners 40 and 42, respectively.

Outer liner 40 and inner liner 42 are spaced radially inward from a combustor casing 46 and define a combustion chamber 48. Combustor casing 46 is generally annular and extends downstream from an exit 50 of a compressor, such as compressor 14 shown in FIG. 1. Outer liner 40 and combustor casing 46 define an outer passageway 52 and inner liner 42 and an inner support structure (not shown) define an inner passageway 54. Outer and inner liners 40 and 42, respectively, extend to a turbine inlet nozzle 58 disposed downstream from combustion chamber 48.

In the exemplary embodiment, combustor dome assembly 44 is arranged in a single annular configuration. In another embodiment, combustor dome assembly 44 is arranged in a double annular configuration. In a further embodiment, combustor dome assembly 44 is arranged in a triple annular configuration. In the exemplary embodiment, combustor dome assembly 44 provides structural support to an upstream end of combustor 16. More specifically, gas turbine engine assembly 10 includes an attachment assembly to facilitate securing combustor 16 within core gas turbine engine 13 utilizing combustor dome assembly 44.

Figure 4:
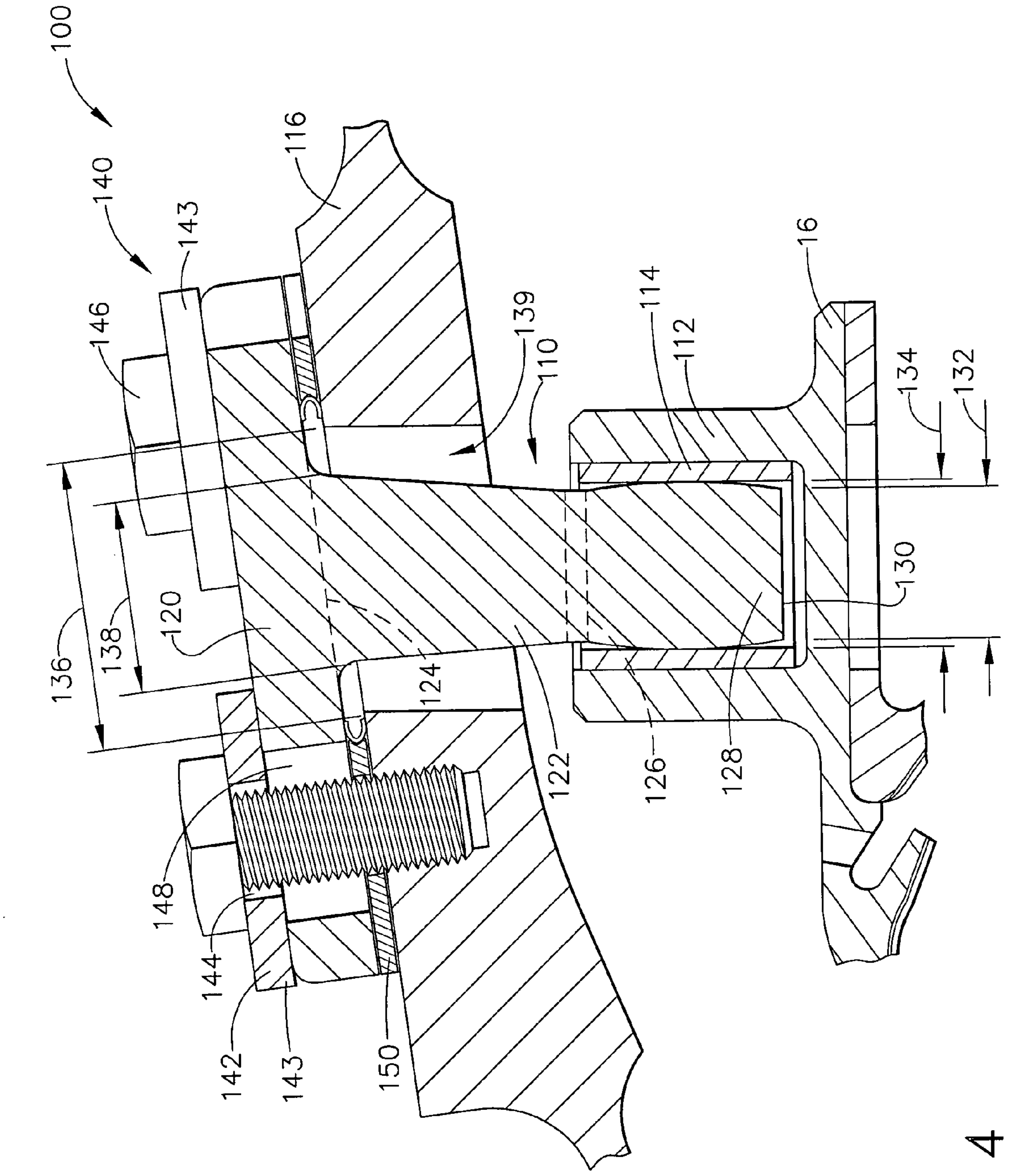
FIG. 4 is a cross-sectional view of an exemplary attachment assembly that may be utilized with the gas turbine engine shown in FIG. 2.
Figure 5:
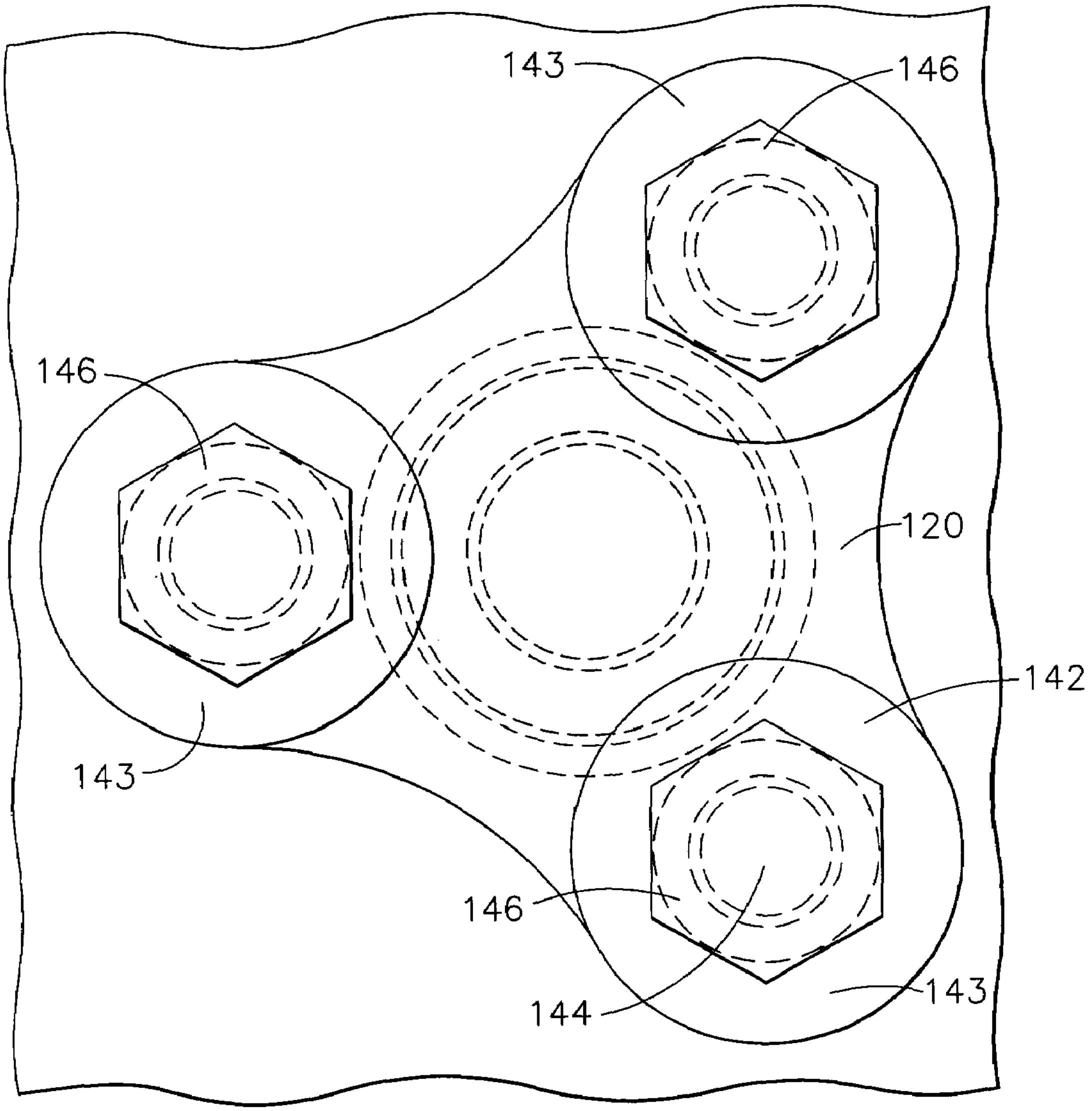
FIG. 5 is a top view of the attachment assembly shown in FIG. 4.

FIG. 4 is an exemplary attachment assembly 100 that may be utilized to secure an axisymmetric structure, such as combustor 16 within a gas turbine engine, such as gas turbine engine 10. FIG. 5 is a top view of a portion of attachment assembly 100 shown in FIG. 4. Although, the attachment assembly is described herein with respect to exemplary gas turbine engine 10, it should be realized that the attachment assembly may be utilized to install and/or align an axisymmetric structure in a wide variety of gas turbine engines.

In the exemplary embodiment, attachment assembly 100 includes a plurality of radially oriented alignment pins 110 that are each at least partially inserted into combustor dome boss 112 that is coupled to combustor 16. More specifically, a portion of alignment pin 110 is at least partially inserted into a respective female bushing 114 that is coupled within the dome boss 112. During assembly, each alignment pin 110 is inserted through an opening formed through the combustor outer casing 116 such that a portion of the alignment pin 110 may be at least partially inserted into dome boss 112.

More specifically, each alignment pin 110 has a substantially T-shaped cross-sectional profile and includes a head portion 120 that is utilized to secure alignment pin 110 within bushing 114, a shaft portion 122 having a first end 124 that is coupled to head portion 120 and a second end 126 that is coupled to a crowned portion 128.

In the exemplary embodiment, crowned portion 128 is formed unitarily with head portion 120 and shaft portion 122. Crowned portion 128 extends from an end 130 of alignment pin 110 at least partially toward shaft portion 122. More specifically, crowned portion 128 has a first diameter 132 at end 130. Crowned portion 128 then gradually tapers outwardly in the direction of shaft portion 122 to an apex wherein crowned portion 128 has a second diameter 134 that is greater than the first diameter 132. Crowned portion 128 then gradually tapers inwardly in the direction of shaft portion 122 until the diameter of the crowned portion is approximately equal to the diameter of shaft portion 122, i.e. diameter 132.

In the exemplary embodiment, crowned portion 128, i.e. the crowned surface of pin 110 which engages bushing 114, facilitates allowing misalignment of the pin centerline with the axis of the bushing diameter while maintaining a line contact, rather than a point contact as in the prior art, and thus provides a superior wear surface. Moreover, the crowned portion 128, defined by a relatively large, two inches or greater partial radius, is such that, when a very small amount of radial pin wears occurs, the line contact becomes contact over a relatively large area. This large area then serves to reduce the contact stress level resulting from the axial/tangential combustor loads and therefore serves to further retard wear and improve durability. Attachment assembly 110 also includes a retaining assembly 140 that may be utilized to secure pin 110 to combustor outer casing 116.

In one embodiment, the head 120 of pin 110 has a diameter 136 that is greater than a diameter 138 of an opening 139 extending through combustor outer casing 116. Moreover, retaining assembly 140 includes a substantially triangular shaped cap plate 142, that in the exemplary embodiment includes three openings 144 extending therethrough that are each sized to receive a respective fastener 146. In the exemplary embodiment, fasteners 146 are threaded bolts that utilized to secure both cap plate 142 and thus pin 110 to combustor outer casing 116.

During assembly, crowned portion 128 is inserted through opening 139 in combustor outer casing 116 and is at least partially inserted into bushing 114 such that at least a portion of crowned portion 128 is in contact with bushing 114. More specifically, the crowned portion 128 of alignment pin 110 is now a relatively close diametrical fit to bushing 114. Accordingly, the combustor tolerance is accommodated by the axial and tangential clearance that is provided by a space 148 that is defined between the alignment pin head portion 120 and an interior surface fasteners.

In one embodiment, the retaining assembly 140 includes a spacer or gasket 150 that is coupled between head portion 120 and combustor outer casing 116. Optionally, retaining assembly 140 does not include the spacer 150, rather head portion 120 is coupled directly against combustor outer casing 116. After pin 110 is at least partially inserted into bushing 114, cap plate 142 is then positioned adjacent an upper surface of head portion 120, and the plurality of fasteners 146 are utilized to secure both cap plate 142 and thus alignment pin 110 to the gas turbine engine.

Accordingly, as shown in FIGS. 4 and 5, attachment assembly 100 includes cap plate 142 that is coupled at the radially outward end of alignment pin 110 to facilitate securing alignment pin 110 to combustor outer casing 116. In the exemplary embodiment, cap plant 142 includes three washer 143 as shown includes a single opening. Optionally, cap plate 142 is formed as a unitary structure and includes two, three, and/or four openings that are each sized to receive a respective bolt to facilitate securing the flange 142 to the combustor outer casing 116 and thus secure alignment pin 110 to the gas turbine engine. During assembly of the axisymmetric structures, the pin 110 is inserted through the outer case and engages the boss on the combustor. The pin 110 is allowed to float within the outer case penetration hole based on the location of the combustor boss. The bolts 146 are then inserted through the flange openings to secure the pin 110 to the combustor outer casing 116. The bolts 146 facilitate producing the clamp load to hold the pin 110 in place through friction. In operation, the variation in combustor boss true position may be accommodated by increasing the size of the flange holes utilizing washers or bolts with increased bearing surface diameters in order to have enough contact area with the pin flange.

Figure 6:
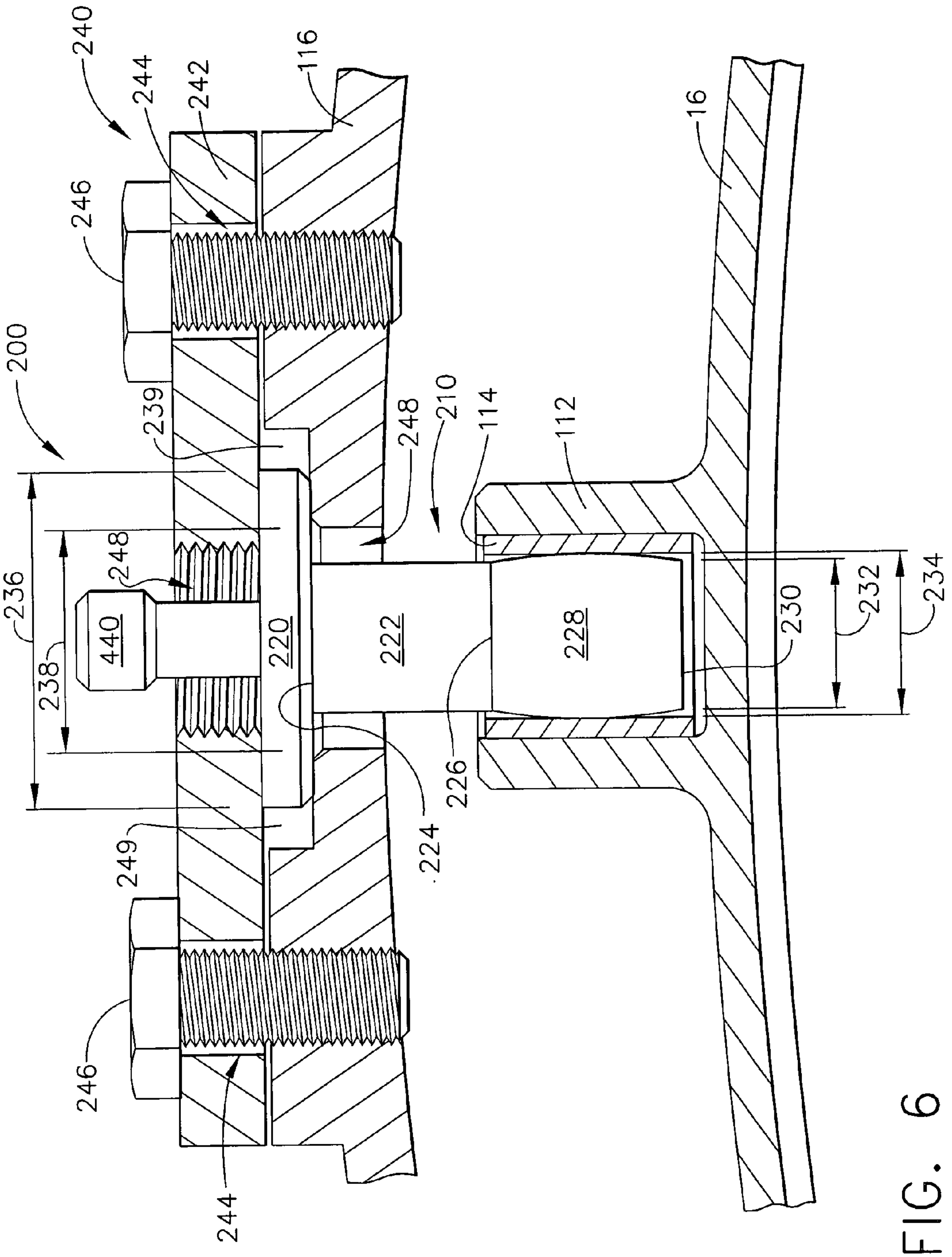
FIG. 6 is a cross-sectional view of an exemplary attachment assembly that may be utilized with the gas turbine engine shown in FIG. 2.
Figure 7:
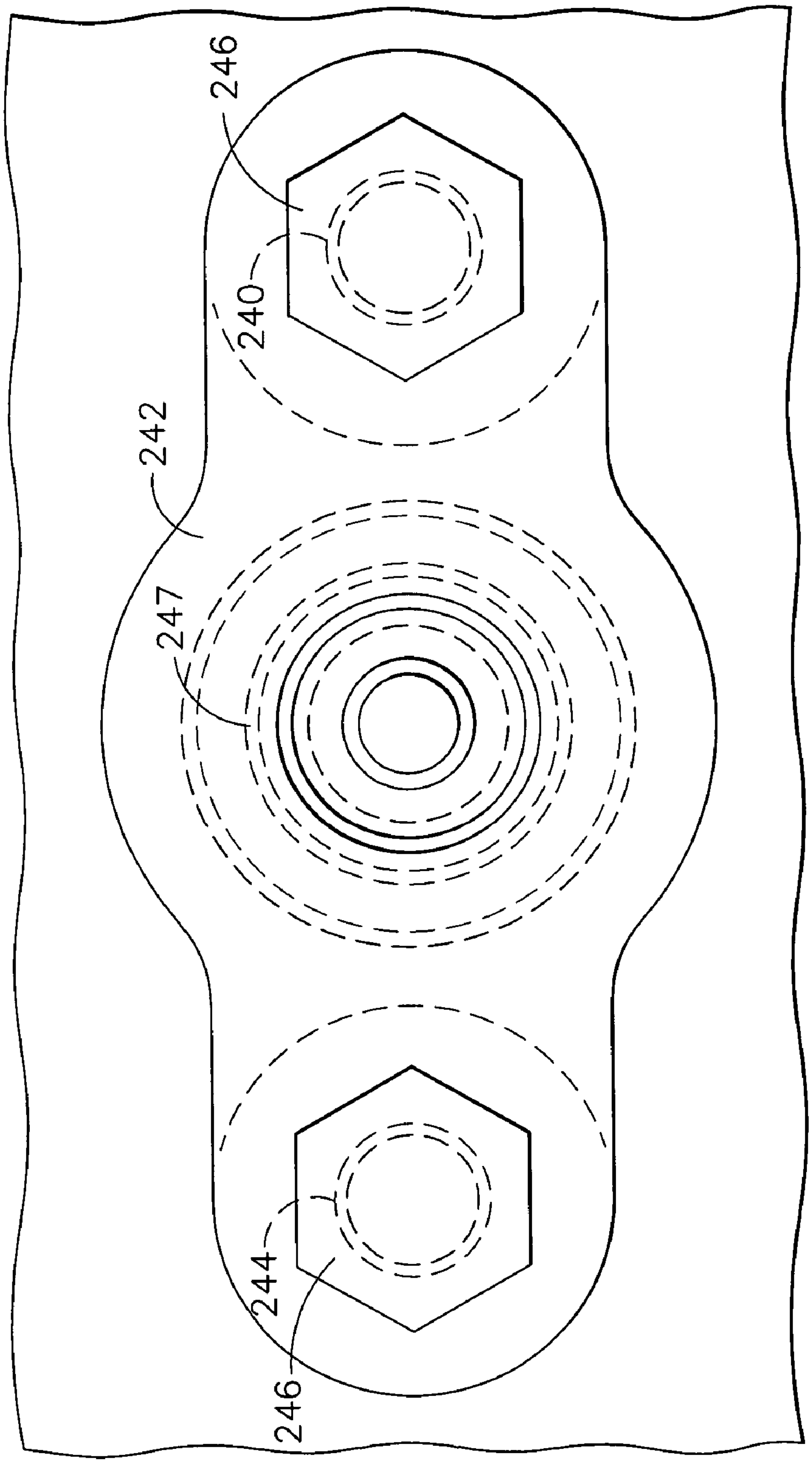
FIG. 7 is a top view of the attachment assembly shown in FIG. 6.

FIG. 6 is an exemplary attachment assembly 200 that may be utilized to secure an axisymmetric structure, such as combustor 16 within a gas turbine engine, such as gas turbine engine 10. FIG. 7 is a top view of a portion of attachment assembly 200 shown in FIG. 6. Although, the attachment assembly is described herein with respect to exemplary gas turbine engine 10, it should be realized that the attachment assembly may be utilized to install and/or align an axisymmetric structure in a wide variety of gas turbine engines.

In the exemplary embodiment, attachment assembly 200 includes a plurality of radially oriented alignment pins 210 that are each at least partially inserted into combustor dome boss 112 that is coupled to combustor 16. More specifically, a portion of alignment pin 210 is at least partially inserted into a respective female bushing 114 that is coupled within the dome boss 112. During assembly, each alignment pin 210 is inserted through an opening formed through the combustor outer casing 116 such that a portion of the alignment pin 210 may be at least partially inserted into dome boss 112.

More specifically, each alignment pin 210 has a substantially T-shaped cross-sectional profile and includes a head portion 220 that is utilized to secure alignment pin 210 within bushing 114, a shaft portion 222 having a first end 224 that is coupled to head portion 220 and a second end 226 that is coupled to a crowned portion 228.

In the exemplary embodiment, crowned portion 228 is formed unitarily with head portion 220 and shaft portion 222. Crowned portion 228 extends from an end 230 of alignment pin 210 at least partially toward shaft portion 222. More specifically, crowned portion 228 has a first diameter 232 at end 230. Crowned portion 228 then gradually tapers outwardly in the direction of shaft portion 222 to an apex wherein crowned portion 228 has a second diameter 234 that is greater than the first diameter 232. Crowned portion 228 then gradually tapers inwardly in the direction of shaft portion 222 until the diameter of the crowned portion is approximately equal to the diameter of shaft portion 222, i.e. diameter 232.

In the exemplary embodiment, crowned portion 228, i.e. the crowned surface of pin 210 which engages bushing 114, facilitates allowing misalignment of the pin centerline with the axis of the bushing diameter while maintaining a line contact, rather than a point contact as in the prior art, and thus provides a superior wear surface. Moreover, the crowned portion 228, defined by a relatively large, two inches or greater partial radius, is such that, when a very small amount of radial pin wears occurs, the line contact becomes contact over a relatively large area. This large area then serves to reduce the contact stress level resulting from the axial/tangential combustor loads and therefore serves to further retard wear and improve durability. Attachment assembly 200 also includes a retaining assembly 240 that may be utilized to secure pin 210 to combustor outer casing 116.

In one embodiment, the head 220 of pin 210 has a diameter 236 that is greater than a diameter 238 of an opening 239 extending through combustor outer casing 116. Moreover, retaining assembly 240 includes a substantially oval-shaped cap plate 242 that in the exemplary embodiment includes two openings 244 extending therethrough that are each sized to receive a respective fastener 246 and a third opening 248 that is sized to circumscribe at least a portion of pin 210. Optionally, cap plate 242 includes a plurality of washers that are utilized to secure pin 210 to combustor outer casing 116. In the exemplary embodiment, fasteners 246 are threaded bolts that utilized to secure both cap plate 242 and thus pin 210 to combustor outer casing 116.

During assembly, crowned portion 228 is inserted through opening 239 in combustor outer casing 116 and is at least partially inserted into bushing 114 such that at least a portion of crowned portion 228 is in contact with bushing 114. More specifically, the crowned portion 228 of alignment pin 210 is now a relatively close diametrical fit to bushing 114. Accordingly, the combustor tolerance is accommodated by the axial and tangential clearance that is provided by a space 248 that is defined between the alignment pin head portion 220 and a recessed portion 249 of combustor outer casing 116.

After pin 210 is at least partially inserted into bushing 114, cap plate 242 is then positioned adjacent an upper surface of head portion 220, and the plurality of fasteners 246 are utilized to secure both cap plate 242 and thus alignment pin 210 to the gas turbine engine.

Accordingly, as shown in FIGS. 6 and 7, attachment assembly 200 includes a pin 210 having a flange, i.e. cap plate 242, that is coupled at the radially outward end of alignment pin 210 to facilitate securing alignment pin 210 to combustor outer casing 116. In the exemplary embodiment, flange 242 is shown as a two openings. Optionally, flange 242 may include a three, four, or more openings that are each sized to receive a respective bolt to facilitate securing the flange 242 to the combustor outer casing 116 and thus secure alignment pin 210 to the gas turbine engine. During assembly of the axisymmetric structures, the pin 210 is inserted through the outer case and engages the boss on the combustor. The pin 210 is allowed to float within the outer case penetration hole based on the location of the combustor boss. The bolts 246 are then inserted through the flange openings to secure the pin 210 to the combustor outer casing 116. Accordingly, a compressive load from the cap plate, i.e. cap plate 242, onto the pin 110 produces the necessary friction load to hold the pin in place.

Figure 8:
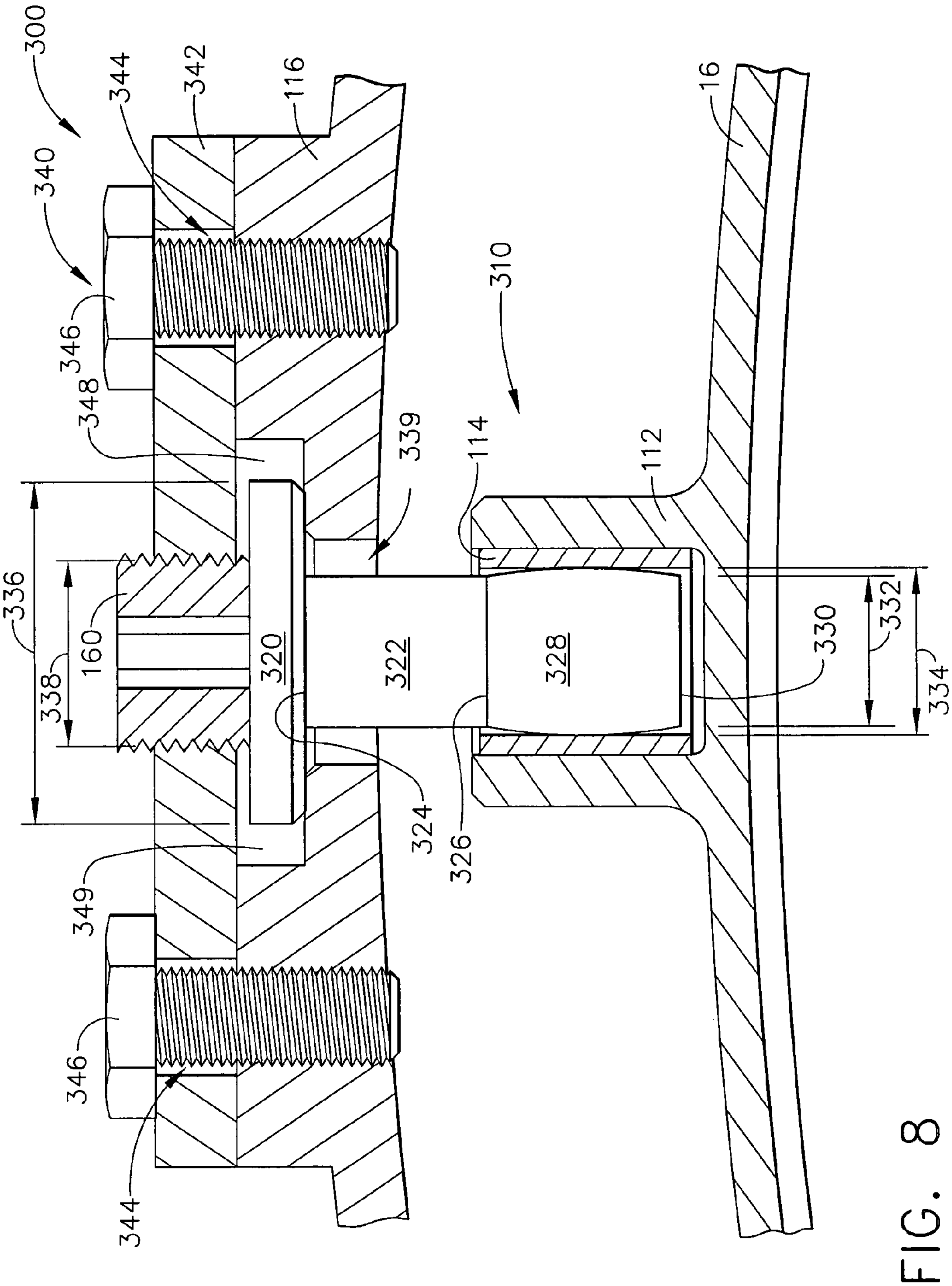
FIG. 8 is a cross-sectional view of an exemplary attachment assembly that may be utilized with the gas turbine engine shown in FIG. 2.
Figure 9:
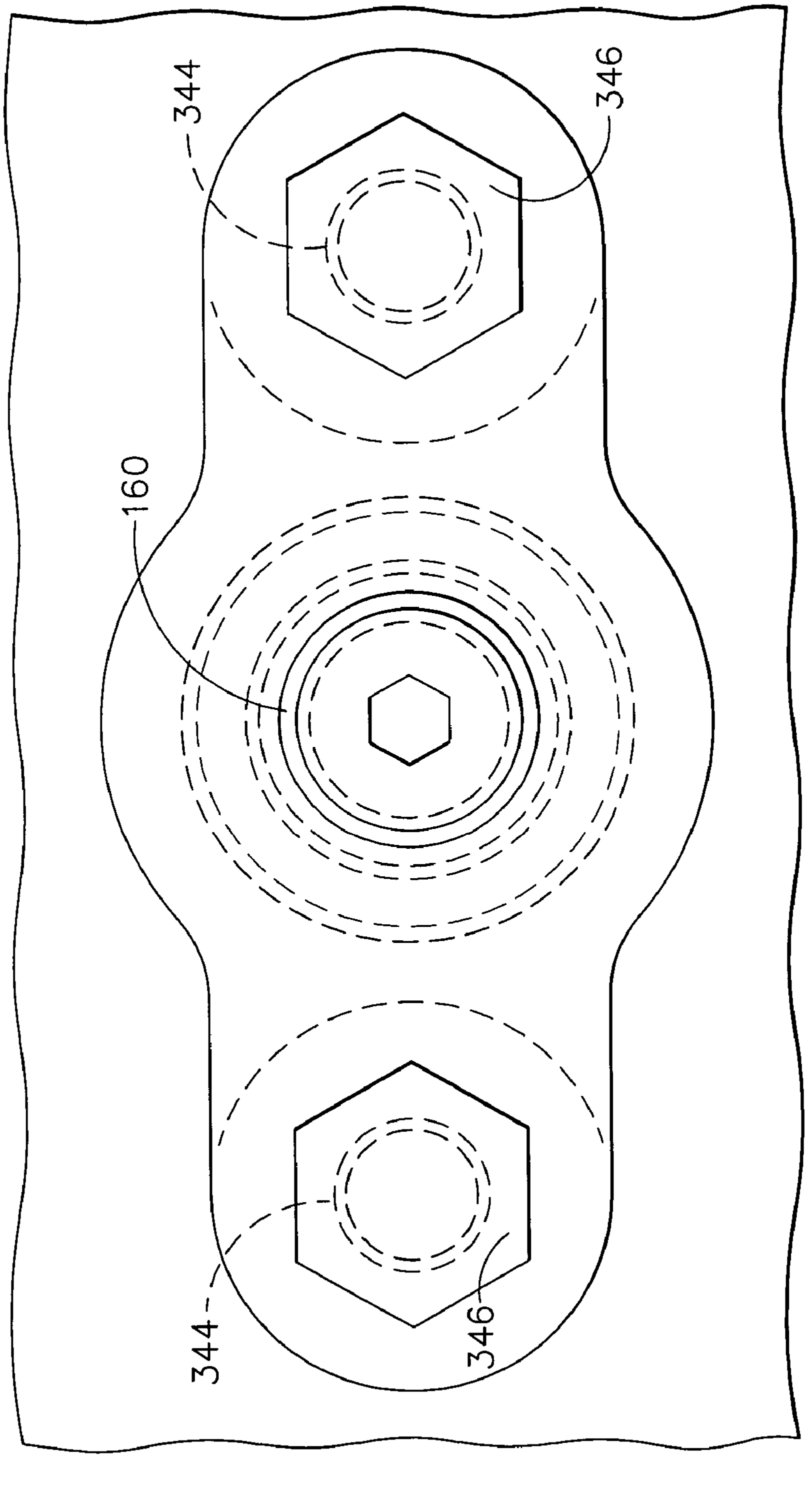
FIG. 9 is a top view of the attachment assembly shown in FIG. 6.

FIG. 8 is an exemplary attachment assembly 300 that may be utilized to secure an axisymmetric structure, such as combustor 16 within a gas turbine engine, such as gas turbine engine 10. FIG. 9 is a top view of a portion of attachment assembly 300 shown in FIG. 8. Although, the attachment assembly is described herein with respect to exemplary gas turbine engine 10, it should be realized that the attachment assembly may be utilized to install and/or align an axisymmetric structure in a wide variety of gas turbine engines.

In the exemplary embodiment, attachment assembly 300 includes a plurality of radially oriented alignment pins 310 that are each at least partially inserted into combustor dome boss 112 that is coupled to combustor 16. More specifically, a portion of alignment pin 310 is at least partially inserted into a respective female bushing 114 that is coupled within the dome boss 112. During assembly, each alignment pin 310 is inserted through an opening formed through the combustor outer casing 116 such that a portion of the alignment pin 310 may be at least partially inserted into dome boss 112.

More specifically, each alignment pin 310 has a substantially T-shaped cross-sectional profile and includes a head portion 320 that is utilized to secure alignment pin 310 within bushing 114, a shaft portion 322 having a first end 324 that is coupled to head portion 320 and a second end 326 that is coupled to a crowned portion 328.

In the exemplary embodiment, crowned portion 328 is formed unitarily with head portion 320 and shaft portion 322. Crowned portion 328 extends from an end 330 of alignment pin 310 at least partially toward shaft portion 322. More specifically, crowned portion 328 has a first diameter 332 at end 330. Crowned portion 328 then gradually tapers outwardly in the direction of shaft portion 322 to an apex wherein crowned portion 328 has a second diameter 334 that is greater than the first diameter 332. Crowned portion 328 then gradually tapers inwardly in the direction of shaft portion 322 until the diameter of the crowned portion is approximately equal to the diameter of shaft portion 322, i.e. diameter 332.

In the exemplary embodiment, crowned portion 328, i.e. the crowned surface of pin 310 which engages bushing 114, facilitates allowing misalignment of the pin centerline with the axis of the bushing diameter while maintaining a line contact, rather than a point contact as in the prior art, and thus provides a superior wear surface. Moreover, the crowned portion 328, defined by a relatively large, two inches or greater partial radius, is such that, when a very small amount of radial pin wears occurs, the line contact becomes contact over a relatively large area. This large area then serves to reduce the contact stress level resulting from the axial/tangential combustor loads and therefore serves to further retard wear and improve durability. Attachment assembly 310 also includes a retaining assembly 340 that may be utilized to secure pin 310 to combustor outer casing 116.

In one embodiment, the head portion 320 of pin 310 has a diameter 336 that is greater than a diameter 338 of an opening 339 extending through combustor outer casing 116. Moreover, retaining assembly 340 includes a substantially oval-shaped cap plate 342 that in the exemplary embodiment includes two openings 344 extending therethrough that are each sized to receive a respective fastener 346 and a third opening 348 that is sized to circumscribe at least a portion of pin 310. In the exemplary embodiment, fasteners 346 are threaded bolts that utilized to secure both cap plate 342 and thus pin 310 to combustor outer casing 116.

During assembly, crowned portion 328 is inserted through opening 339 in combustor outer casing 116 and is at least partially inserted into bushing 114 such that at least a portion of crowned portion 328 is in contact with bushing 114. More specifically, the crowned portion 328 of alignment pin 310 is now a relatively close diametrical fit to bushing 114. Accordingly, the combustor tolerance is accommodated by the axial and tangential clearance that is provided by a space 348 that is defined between the alignment pin head portion 320 and a recessed portion 349 of combustor outer casing 116.

After pin 310 is at least partially inserted into bushing 114, cap plate 342 is then positioned adjacent an upper surface of head portion 320, and the plurality of fasteners 346 are utilized to secure both cap plate 342 and thus alignment pin 310 to the gas turbine engine.

Accordingly, as shown in FIGS. 8 and 9, attachment assembly 300 includes a pin 210 having a flange, i.e. cap plate 342, that is coupled at the radially outward end of alignment pin 310 to facilitate securing alignment pin 310 to combustor outer casing 116. In the exemplary embodiment, cap plate 342 is shown as a two openings. Optionally, cap plate 342 may include a three, four, or more openings that are each sized to receive a respective bolt to facilitate securing the cap plate 342 to the combustor outer casing 116 and thus secure alignment pin 310 to the gas turbine engine. During assembly of the axisymmetric structures, the pin 310 is inserted through the outer case and engages the boss on the combustor. The pin 310 is allowed to float within the outer case penetration hole based on the location of the combustor boss. The bolts 346 are then inserted through the flange openings to secure the pin 310 to the combustor outer casing 116. Moreover, in this embodiment, the clamp load onto the pin flange, i.e. head portion 320 is produced through a set screw 160 or bolt that is threaded through the cap plate 342. Accordingly, a compressive load from the cap plate 342, onto the pin 310 produces the necessary friction load to hold the pin 110 in a substantially fixed position.

Figure 10:
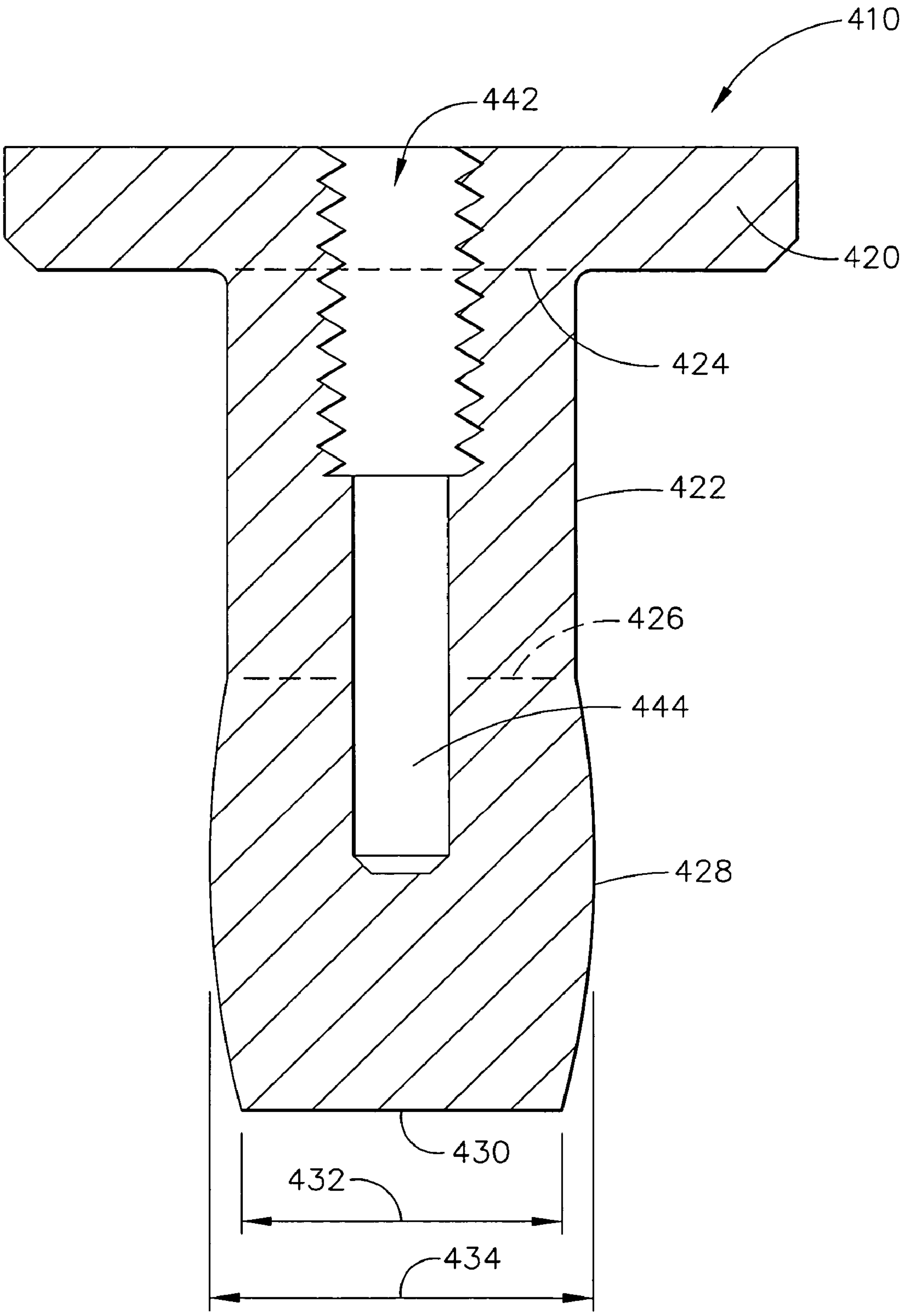
FIG. 10 is a cross-sectional view of an exemplary alignment pin that may be utilized with the attachment assemblies shown in FIGS. 4, 6, and/or 8.

FIG. 10 is an exemplary alignment pin 410 that may be utilized with the alignment assemblies 100, 200, and/or 300 shown in FIGS. 4-9. In the exemplary embodiment, alignment pin 410 has a substantially T-shaped cross-sectional profile and includes a head or flange portion 420 that is utilized to secure alignment pin 410 within a bushing such as bushing 114, a shaft portion 422 having a first end 424 that is coupled to head portion 420 and a second end 426 that is coupled to a crowned portion 428.

In the exemplary embodiment, crowned portion 428 is formed unitarily with head portion 420 and shaft portion 422. Crowned portion 428 extends from an end 430 of alignment pin 410 at least partially toward shaft portion 422. More specifically, crowned portion 428 has a first diameter 432 at end 430. Crowned portion 428 then gradually tapers outwardly in the direction of shaft portion 422 to an apex wherein crowned portion 428 has a second diameter 434 that is greater than the first diameter 432. Crowned portion 428 then gradually tapers inwardly in the direction of shaft portion 422 until the diameter of the crowned portion is approximately equal to the diameter of shaft portion 422, i.e. diameter 432.

In the exemplary embodiment, crowned portion 428, i.e. the crowned surface of pin 410 which engages bushing 114, facilitates allowing misalignment of the pin centerline with the axis of the bushing diameter while maintaining a line contact, rather than a point contact as in the prior art, and thus provides a superior wear surface.

In one embodiment, pin 410 shown in FIG. 8, for example, a knobbed cylinder 440, shown in FIG. 6 for example, extends radially outward from the pin flange, i.e. head portion 220. The knobbed cylinder facilitates providing a feature that can be utilized by an operator to remove the pin during disassembly. Optionally, as shown in FIG. 10, pin 410 includes a threaded opening 442 such that a bolt may be threaded into the tapped opening 442 to facilitate removing pin 410 during disassembly. The benefit is that this approach reduces the weight of the pin. This feature may be utilized with any of the apparatuses described herein. In another embodiment, pin 410 may include a hollow core 444 extending radially inwardly from the tapped opening 442 to facilitate further reducing the weight of pin 410. Accordingly, if the knobbed cylinder 440 is used as the pull-out feature on pin 410, the hollow core 444 may be drilled from the radially inner surface of the pin.

The above-described support arrangement for hardware positioned on the interior of a segmented flow path provides a cost-effective and reliable means for aligning gas turbine interior support hardware with respect to the segmented flowpath components. More specifically, a radial pin is inserted into a cavity of the segmented nozzle to align the interior support structure. The interior support structure is then positioned axially, circumferentially, and with respect to engine axis 34. The fasteners are then tightened to facilitate holding the interior support structure both axially and circumferentially within the gas turbine engine.

Exemplary embodiments of gas turbine engine axisymmetric structure alignment assemblies are described above in detail. The alignment assemblies illustrated are not limited to the specific embodiments described herein, but rather, components of each alignment assembly may be utilized independently and separately from other components described herein. For example, although a combustor is described herein, the alignment assemblies may also be used to align a variety of interior structure hardware to hardware other than a combustor.

While the invention has been described in terms of various specific embodiments, those skilled in the art will recognize that the invention may be practiced with modification within the spirit and scope of the claims.

What is claimed is:

1. A method for assembling a gas turbine engine, said method comprising:

coupling an axisymmetric structure within the gas turbine engine, wherein the axisymmetric structure includes at least one mounting bushing extending from a radially outer surface of the axisymmetric structure;

inserting a pin having a crowned surface at least partially into the mounting bushing such that the pin provides both axial and tangential support to the axisymmetric structure; and securing the pin to the gas turbine engine utilizing at least one of a substantially triangular shaped retaining device and a substantially oval shaped retaining device.

2. A method in accordance with claim 1 wherein the axisymmetric structure includes a combustor, said method further comprising inserting the pin having the crowned surface at least partially into a combustor mounting bushing such that the pin provides both axial and tangential support to the combustor.

3. A method in accordance with claim 2 wherein inserting the pin further comprises securing the pin having a substantially T-shaped cross-section profile into the mounting bushing.

4. A method in accordance with claim 3 wherein the pin includes a head portion, a shaft and a crowned portion, said method further comprising:

inserting the crowned portion at least partially into the combustor mounting bushing; and securing the pin to a combustor outer casing using the retaining device.

5. A method in accordance with claim 4 wherein said method further comprises securing the pin to the combustor outer casing using the substantially triangular shaped retaining device.

6. A method in accordance with claim 4 wherein said method further comprises securing the pin to the combustor outer casing using the substantially oval shaped retaining device.

7. A method in accordance with claim 4 wherein the pin includes a threaded recess extending at least partially through the pin, said method further comprising inserting a threaded fastener at least partially into the threaded recess to facilitate either installing or removing the pin.

8. A method in accordance with claim 4 wherein the pin includes a knobbed portion extending from the pin, said method further comprising using the knobbed portion to facilitate either installing or removing the pin.

9. An assembly for coupling an axisymmetric structure within a gas turbine engine, wherein the axisymmetric structure includes at least one mounting bushing extending from a radially outer surface of the axisymmetric structure, said assembly comprises:

a pin having a crowned surface inserted at least partially into the mounting bushing such that the pin provides both axial and tangential support to the axisymmetric structure; and a retaining assembly to secure said pin to a portion of the gas turbine engine, said retaining assembly comprising at least one of a substantially triangular shaped retaining device and a substantially oval shaped retaining device.

10. An assembly in accordance with claim 9 wherein the axisymmetric structure comprises a combustor, said assembly further comprising a threaded bushing coupled to said gas turbine engine, said retaining assembly configured to secure said pin to said threaded bushing.

11. An assembly in accordance with claim 9 wherein said pin has a substantially T-shaped cross-section profile and includes at least one opening extending at least partially therethrough to facilitate reducing an weight of said pin.

12. An assembly in accordance with claim 9 wherein said pin comprises a head portion, a shaft and a crowned portion, said crowned portion at least partially inserted into a combustor dome boss, said head portion at least partially inserted into said threaded bushing.

13. An assembly in accordance with claim 12 wherein said pin comprises a threaded recess extending at least partially therethrough, said threaded recess sized to receive a threaded fastener therein to facilitate either installing or removing said pin.

14. An assembly in accordance with claim 12 wherein said pin comprises a knobbed portion recess extending from said pin head portion, said knobbed portion sized to receive a removal tool to facilitate either installing or removing said pin.

15. A gas turbine engine comprising:

an axisymmetric structure within the gas turbine engine, wherein the axisymmetric structure includes at least one mounting bushing extending from a radially outer surface of the axisymmetric structure; and an assembly for coupling said axisymmetric structure within said gas turbine engine, said assembly comprising a pin having a crowned surface inserted at least partially into the mounting bushing such that the pin provides both axial and tangential support to the axisymmetric structure; and a retaining assembly to secure said pin to a portion of the gas turbine engine, said retaining assembly comprising at least one of a substantially triangular shaped retaining device and a substantially oval shaped retaining device.

16. A gas turbine engine in accordance with claim 15 wherein said axisymmetric structure comprises a combustor comprising a dome boss, said assembly further comprising a threaded bushing coupled to a combustor outer liner bushing, said retaining assembly configured to secure said pin to said outer liner bushing.

17. A gas turbine engine in accordance with claim 15 wherein said pin has a substantially T-shaped cross-section profile.

18. A gas turbine engine in accordance with claim 16 wherein said pin comprises a head portion, a shaft and a crowned portion, said crowned portion at least partially inserted into a combustor dome boss, said head portion at least partially inserted into said outer liner bushing.

19. A gas turbine engine in accordance with claim 16 wherein said pin comprises a threaded recess extending at least partially therethrough, said threaded recess sized to receive a threaded fastener therein to facilitate either installing or removing said pin.

20. A gas turbine engine in accordance with claim 15 wherein said pin comprises a knobbed portion recess extending from said pin head portion, said knobbed portion sized to receive a removal tool to facilitate either installing or removing said pin.

* * * * *

UNITED STATES PATENT AND TRADEMARK OFFICE

CERTIFICATE OF CORRECTION

PATENT NO. : 7,493,771 B1
APPLICATION NO. : 11/289965
DATED : February 24, 2009
INVENTOR(S) : Lohmueller et al.

It is certified that error appears in the above-identified patent and that said Letters Patent is hereby corrected as shown below:

Column 6, beginning on line 44, delete "axisyrn- metric", and insert therefor
-- axisym- metric --

Signed and Sealed this

Ninth Day of February, 2010

David J. Kappos
*Director of the United States Patent and Trademark Office*